May 15, 1945. E. BARNES Re. 22,641

WORK HOLDING DEVICE

Original Filed Nov. 22, 1939

Inventor
Edwin Barnes

By

A. F. Flournoy Attorney

Reissued May 15, 1945

Re. 22,641

UNITED STATES PATENT OFFICE 22,641

WORK HOLDING DEVICE

Edwin Barnes, Marshall, Tex.

Original No. 2,299,294, dated October 20, 1942, Serial No. 305,587, November 22, 1939. Application for reissue October 17, 1944, Serial No. 559,078

8 Claims. (Cl. 90—60)

My invention relates generally to clamping devices, and more particularly to a clamping device for holding several pieces of work at the same time.

An object of my invention is to provide a clamp for clamping a single piece of work, or several pieces of work, in line upon the bed of a planing mill or similar machine.

Other objects and advantages of my invention will become apparent from a reading of the detailed description of the invention in connection with the drawing illustrating a preferred form of my invention.

Figure 1:
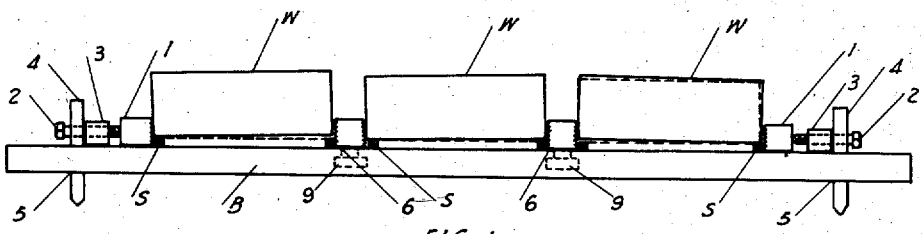
Fig. 1 is an elevation view of my work holding device showing a number of pieces of work held clamped in line with one another and clamped down on the bed of a machine.
Figure 2:
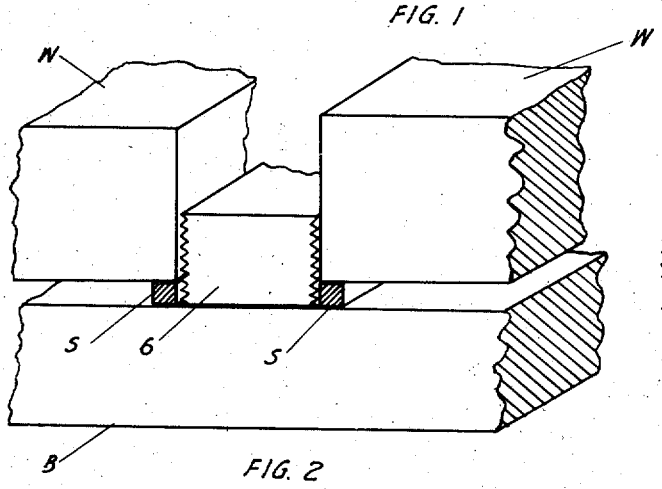
Fig. 2 is an enlarged perspective view, partly in section, showing more details of the center clamping member of my work holding device in holding position.
Figure 5:
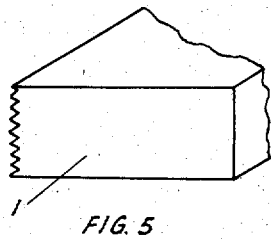
Fig. 5 is an enlarged broken perspective view of an end clamping member of my work holding device.
Figure 3:
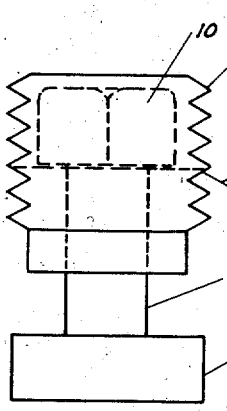
Fig. 3 is an end elevation view of the center clamp member.
Figure 4:
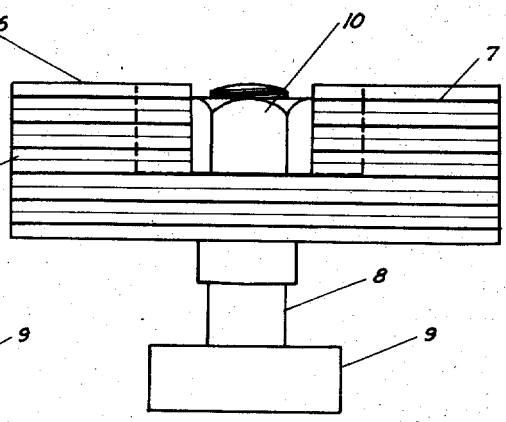
Fig. 4 is a side elevation view of the center clamp member.

In the drawing, B designates the work bed of a machine carrying my work holding device. The letter W designates pieces of work held by my work holding device. The spacing strips designated by letter S serve to hold the work off the base of the working plate of the machine. While these spacing strips S cooperate with my work holding device, they are not to be considered as an essential part of the combination of elements making up my work holding device. The special function of the strips S is to elevate the work, such as an unlevel casting or the like, above the working surface of the machine to prevent any tendency of the casting, or the like, from rocking after it is clamped.

The end clamp 1 consists of a rectangular steel slab which is provided with longitudinal biting edges along one of its longest faces.

The end clamp 1 is urged up against the work W by means of a screw and pressure bar combination comprising a set screw 2 threaded through a pressure bar 3 to contact the clamp 1. The pressure bar is prevented from backing up due to the reaction of the screw 2 on the clamp 1 by means of a pair of spacer pins 4 shown in Fig. 1 mounted in a pair of spacer pin holes 5 through the base B of the machine.

The center clamps designated generally by numeral 6 are provided with long biting knife edges or teeth 7 on both of their longer sides so that they bite into opposing pieces of work when pressure is applied to the end clamps 1.

The center clamps 6 are slidably held on the base B of the machine by means of flat headed clamping bolts 8 whose heads 9 slide in T shaped grooves in the bed B below its working surface. Each clamp has a tongue fixed on the lower side thereof through which the bolt extends and which tongue interfits with the groove to guide the clamp in sliding movement relative to the base.

The vertical position of the center clamp is controlled by the clamping nuts 10 on the clamping bolts 8. The center clamp 6 is provided with a recess into which the nut 10 fits. This recess is important in that it prevents the nuts from extending above the clamp 6 itself to interfere with the cutting of the work W. When very thin work is being handled the upper face of the clamp sometimes must be set close to the face of the work being cut.

My invention, broadly speaking, is the combination of two end clamps and one or more center clamps slidably mounted in a machine's work bed B on a line connecting the end clamps. The work W, held in my work holding device, may be machined on its upper face and both side faces with one setting. The number of pieces of work to be machined is limited only by the length and width of the bed B of the machine and the number of tool heads or milling cutters employed. Fig. 1 of the drawing illustrates a set up of three pieces of work W being held by the use of two center clamps 6. Obviously additional center clamps would be used if more than three pieces of work W were set up.

In practice, the work is placed over the longitudinal slots of the bed of the machine with center clamps 6 in place between the pieces of work W. Suitable parallel strips S are used to elevate the work W to provide clearance. At each extremity of the series of pieces of work W there is placed an end clamp 1 backed up by a pressure bar 3, set screw 2, and spacer pins 4, as described above for the purpose of tightening the work W. While my work holding device would operate with a single pressure applying device of the style described above, or some other type of pressure applying device, the use of the two pressure applying devices have been found to be of advantage. I have illustrated my invention showing the use of the two pressure applying devices, but it must be understood that I am not limiting my invention to the style shown employing two pressure applying devices.

Usually when a series of pieces of work are clamped in line with one another, using my work holding device, the pieces of work W buckle slightly. This buckling may be deliberately brought about, if desired, when extreme pressure on the work W is needed, by prying up the middle portion of the aligned work pieces. After the end pressure has been applied on the series of end and center clamps and pieces of work W, the center clamp 6 may be pulled down to the bed B of the machine by means of the bolts 8 and the nuts 10. This movement of the center clamps takes out all of the slack in the assembled work W and causes the biting edges on the clamp to bite still further into the work W. This extreme clamping pressure is peculiar to my invention. As far as applicant is aware of it, such high pressure cannot be obtained by any of the prior art work holding means.

I do not restrict myself to the particular form of construction or arrangement of parts making up my work holding device as herein illustrated and described, for it is apparent that various changes in size and arrangement of parts may be resorted to without departing from my invention.

My clamping device may be constructed out of hard steel or other suitable materials.

Having thus described my invention, I claim:

1. A work holder of the class described comprising a pair of opposing longitudinally adjustable pressure applying end clamps, each of said end clamps being provided with an anchoring means for anchoring the same to a machine bed or the like, said anchoring means including a pressure bar which extends across a pair of spacer pins extended up from the machine bed, each of said end clamps being provided with clamping jaws including horizontally extending knife edges adapted to bite into a piece of work, and a work separating and holding clamp provided with a vertically adjustable attaching means for attaching it to a machine bed or the like, said attaching means comprising a clamping bolt including a head adapted to slide in a T slot in a machine bed, said separating and holding clamp being positioned in line with and between the said end clamps and being provided with parallel faces each of which is provided with knife edges adapted to bite into pieces of work.

2. A work holder of the class described comprising a pair of opposing longitudinally adjustable pressure applying end clamps, each of said end clamps being provided with an anchoring means for anchoring the same to a machine bed or the like, said anchoring means including a flat pressure bar which extends across a pair of spacer pins extended up from the machine bed, each of said end clamps being provided with a work clamping jaw which is provided with knife edges adapted to bite into a piece of work, each of said end clamps being provided with pressure applying means for moving the said jaws, said pressure applying means including screws having threaded engagement with the said pressure bars and having contact with the said work clamping jaws and a work separating and holding clamp provided with a vertically adjustable attaching means for attaching it to a machine bed or the like, said attaching means including a clamping bolt having a head which is adapted to slide in a T slot in a machine bed or the like, said separating and holding clamp being positioned in line with and between the said end clamps, said separating clamp being provided with parallel jaws each of which is provided with horizontally extending knife edges adapted to bite into pieces of work.

3. A work holder of the class described comprising a longitudinally adjustable pressure applying end clamp, an anchoring means for anchoring the adjustable end clamp to a machine bed, said anchoring means including a bar suspended across a pair of anchoring pins extending up from the machine bed, the said end clamp including a jaw provided with longitudinally extending knife edges adapted to bite into a piece of work, a separating clamp including a pair of parallel work engaging faces, each of which is provided with a series of longitudinally extending knife edges adapted to bite into pieces of work separated by the said separating clamp, a vertically adjustable fastening means for holding the said separating clamp to the machine bed or the like, and an end clamp provided with a work contacting face provided with a series of parallel horizontally extending knife edges adapted to bite into a piece of work, said end clamp being provided with an anchoring means for anchoring it to the machine bed, or the like.

4. A work holder of the character described comprising a longitudinally adjustable pressure applying end clamp, means for anchoring the end clamp to a machine bed, said anchoring means including a bar adapted to extend across a pair of anchoring pins secured to the machine bed, said end clamp including a jaw provided with one or more teeth thereon adapted to bite into a piece of work, a separating clamp having opposite work engaging faces, which are provided with teeth thereon adapted to bite into pieces of work separated by said separating clamp, means for holding said separating clamp to the machine bed, and a second end clamp having a work engaging face provided with teeth thereon adapted to bite into a piece of work in opposed relation to the first-mentioned end clamp, said second end clamp having means for anchoring it to the machine bed.

5. A work holder of the character described comprising a longitudinally adjustable pressure applying end clamp, means for anchoring the end clamp to a machine bed, said anchoring means including a bar adapted to extend across a pair of anchoring pins secured to the machine bed, said end clamp including a jaw provided with one or more teeth thereon adapted to bite into a piece of work, a separating clamp having opposite work engaging faces, which are provided with teeth thereon adapted to bite into pieces of work separated by said separating clamp, means for holding said separating clamp to the machine bed, said holding means being constructed for vertical adjustment of the separating clamp to draw the separating clamp and the work pieces engaged thereby down into supported relation on the machine bed upon outward buckling of said work pieces, and a second end clamp having a work contacting face provided with teeth thereon adapted to bite into a piece of work in opposed relation to the first-mentioned end clamp, and means for anchoring the second end clamp to the machine bed.

6. A work holder of the character described comprising a longitudinally adjustable pressure applying end clamp, means for anchoring the end clamp to a machine bed, said anchoring means including a bar adapted to extend across a pair of anchoring pins secured to the machine bed, said end clamp including a jaw provided with one or more teeth thereon adapted to bite into a piece of work, a separating clamp having opposite work engaging faces, which are provided with teeth thereon adapted to bite into pieces of work separated by said separating clamp, means for holding said separating clamp to the machine bed, and a second end clamp having a work engaging face provided with teeth thereon adapted to bite into a piece of work in opposed relation to the first-mentioned end clamp, said second end clamp having means for anchoring it to the machine bed, said second end clamp having means for longitudinal adjustment thereof toward and from the first-mentioned end clamp, said longitudinally adjustable end clamp being constructed to apply outward buckling action to the work pieces therebetween, and means connected with the separating clamp for adjusting said separating clamp for drawing the work pieces down into supported positions on the machine bed.

7. A work holder of the class described comprising a pair of opposing longitudinally adjustable pressure applying end clamps, each of said end clamps being provided with an anchoring means for anchoring the same to a machine bed or the like, said anchoring means including a pressure bar which extends across a pair of spacer pins extended up from the machine bed, each of said end clamps being provided with clamping jaws including horizontally extending knife edges adapted to bite into a piece of work, and a work separating and holding clamp provided with a vertically adjustable attaching means for attaching it to a machine bed or the like, said attaching means comprising a clamping bolt including a head adapted to slide in a T slot in a machine bed, said separating and holding clamp being positioned in line with and between the said end clamps and being provided with parallel faces each of which is provided with knife edges adapted to bite into pieces of work, said vertically adjustable attaching means for the separating and holding clamp including means for drawing the separating and holding clamp toward the machine bed and thereby drawing inward the work pieces between the clamps out of buckled relation.

8. A work holder comprising a pair of opposing longitudinally adjustable pressure applying end clamps, each of said end clamps including means for anchoring the same to a machine bed, each of said end clamps including a clamp jaw adapted to bear against a piece of work, and a work separating and holding clamp provided with means for attaching said holding clamp to a machine bed, said separating and holding clamp being adapted to be positioned in line with and between the end clamps and provided with opposed faces adapted to bear upon pieces of work.

EDWIN BARNES.